US009697673B2

(12) United States Patent
Kniberg et al.

(10) Patent No.: US 9,697,673 B2
(45) Date of Patent: Jul. 4, 2017

(54) GAMING INTERRUPTION AND RECONNECTION MANAGEMENT

(76) Inventors: Henrik Kniberg, Ska (SE); Ulf Abrink, Balsta (SE); Jens Nilsson, Saltsjo-Boo (SE); Peter Vincent, Magersten (SE); Thomas Rizos, Johannesher (SE); Hakan Andersson, Sundbyberg (SE); Jan Otterling, Vallingby (SE); Ulf Larsson, Taby (SE)

( * ) Notice: Subject to any disclaimer, the term of this patent is extended or adjusted under 35 U.S.C. 154(b) by 714 days.

(21) Appl. No.: 12/497,330

(22) Filed: Jul. 2, 2009
(Under 37 CFR 1.47)

(65) Prior Publication Data

US 2010/0151934 A1 Jun. 17, 2010

Related U.S. Application Data

(63) Continuation-in-part of application No. 12/433,615, filed on Apr. 30, 2009, now abandoned, which is a
(Continued)

(51) Int. Cl.
*A63F 13/00* (2014.01)
*G07F 17/32* (2006.01)

(52) U.S. Cl.
CPC .......... *G07F 17/32* (2013.01); *G07F 17/3239* (2013.01)

(58) Field of Classification Search
CPC ............................. G07F 17/3225; A63F 13/21
(Continued)

(56) References Cited

U.S. PATENT DOCUMENTS 6,117,013 A 9/2000 Eiba
6,165,072 A 12/2000 Davis et al.
(Continued)

FOREIGN PATENT DOCUMENTS

EP 1473682 A2 11/2004
WO 98/29793 7/1998
(Continued)

OTHER PUBLICATIONS

Supplementary European Search Report corresponding to European Patent Application Serial No. 05804136.9, completed May 5, 2011, 8 pages.
(Continued)

*Primary Examiner* — David L Lewis
*Assistant Examiner* — Robert Mosser
(74) *Attorney, Agent, or Firm* — Armstrong Teasdale LLP

(57) ABSTRACT

A method, system and computer program product for managing interruption and reconnection of a game session in a computer based gaming system having a computerized gaming machine devised for executing a game and being communicatively connected to a remote data storage, wherein: the execution of a game comprises at least one instance of determining a set of associated game session data; an identity code is reserved for identification of each execution instance of a game; each determined set of associated game session data is associated with said identity code and stored in the remote data storage; and if an interruption occurs in the execution of a game, then the identity code for the current game execution instance is associated with a status indicator indicating that said game execution has been interrupted.

50 Claims, 6 Drawing Sheets

Related U.S. Application Data continuation of application No. 11/719,059, filed as application No. PCT/SE2005/001717 on Nov. 14, 2005, now abandoned.

(60) Provisional application No. 60/522,843, filed on Nov. 12, 2004.

(58) Field of Classification Search
USPC .......................................... 463/16, 24, 42, 43
See application file for complete search history.

(56) References Cited

U.S. PATENT DOCUMENTS

| | | | |
|---|---|---|---|
| 6,280,328 | B1 | 8/2001 | Holch et al. |
| 6,390,922 | B1 | 5/2002 | Vange et al. |
| 6,811,486 | B1 | 11/2004 | Luciano, Jr. |
| 2001/0046893 | A1 | 11/2001 | Giobbi et al. |
| 2003/0148806 | A1 | 8/2003 | Weiss |
| 2004/0032083 | A1 | 2/2004 | Walker et al. |
| 2004/0038740 | A1 | 2/2004 | Muir |
| 2004/0106452 | A1 | 6/2004 | Nguyen et al. |

FOREIGN PATENT DOCUMENTS

| | | | |
|---|---|---|---|
| WO | 98/35309 | | 8/1998 |
| WO | 00/67424 | | 11/2000 |
| WO | 03/023647 | A1 | 3/2003 |
| WO | 03/068349 | A1 | 8/2003 |
| WO | 03/093921 | A2 | 11/2003 |
| WO | 2004034223 | A2 | 4/2004 |
| WO | 2006052213 | A1 | 5/2006 |

OTHER PUBLICATIONS

International Search Reported, PCT/SE 2005/001716, mailed Feb. 21, 2006.

International Search Report corresponding to International Application No. PCT/SE2005/001717, 3 pages, mailed Feb. 2, 2006.

International Preliminary Report on Patentability corresponding to International Application No. PCT/SE2005/001717, 6 pages, Jan. 25, 2007.

GAMING INTERRUPTION AND RECONNECTION MANAGEMENT

RELATED APPLICATIONS

The application is a continuation-in-part of application Ser. No. 12/433,615 filed Apr. 30, 2009, which is a continuation of application Ser. No. 11/719,059, which is the National Stage (filed on May 10, 2007) of International Application No. PCT/SE2005/01717 having an international filing date of Nov. 14, 2005, and claims priority to U.S. Provisional Patent Application No. 60/522,843 filed Nov. 12, 2004, all of which are incorporated herein by reference in their entirety.

TECHNICAL FIELD

The present invention relates in general to the management of interruption and reconnection of a computerized game of chance operated in a gaming system configured with a gaming machine connected to remote data storage

BACKGROUND

In computerized gaming, a game session can be interrupted for various reasons for example due to failure in electric power supply or data communications, machine error, operating error or intentional interruption by the player. In gaming, involving casino game or lottery game types, there is usually a bet and a possible winning prize payback at stake. A player may be about to win when interruption occurs and thus may be deprived of his winning play or his payout if the game is lost. Gaming systems are usually also subject to strict control from authorities that require game record keeping for audit purposes, and it is not acceptable for game records to deviate from factual payouts. It is therefore important for the credibility of the gaming operator to manage interruption and game resumption in a secure and correct manner.

Traditionally, each game must handle its own interruption and reconnection management. It is a current trend that gaming systems run gaming software from different independent game developers. Since reconnection is a complex and error prone procedure there is a risk for instability in the gaming system if reconnection is handled in a non-uniform way.

PRIOR ART

Examples of prior art is found in the following patent publications.

U.S. Pat. No. 5,395,242 shows a computer simulation playback method that includes the steps of recording commands entered during use of a simulation, operating the simulation with the recorded commands and allowing new commands to be entered at any point during the step of operating the simulation with the recorded commands. More specifically, the method runs a simulation on a computer system that includes a user input device and a visual display. Images are shown on the display and the person using the simulation enters commands through the user input device. The commands affect the images shown on the visual display and are recorded in the sequence that they were entered. The method then runs the simulation again and automatically enters the recorded commands in the same sequence that they were recorded so that substantially the same images that were produced when the commands were initially entered are displayed again. During that step, new commands can be entered. Once certain new commands are entered, the recorded commands are pre-empted and the user can use the simulation anew from the point where the new commands were entered.

This piece of prior art is directed to computer games, e.g. an Airplane dogfight, and allows for recording player inputs, replay and add new inputs. The system is configured to record all user inputs to the game software during execution. The system is further configured to simulate a first game software execution by inputting said recorded non deterministic inputs to said game software during a second execution. The purpose is to enable the player to alter the action and outcome of the game at any desired point.

U.S. Pat. No. 4,342,454 discloses a method and system wherein instant replay for microprocessor-controlled video games is provided by storing and retaining for a period of time in a random access memory the results of microprocessor polling of each of the player command entry devices. In a memory conserving embodiment only newly entered player commands and the times when such commands are entered need be stored and retained. It is further shown that user inputs are recorded and sampled with a certain sampling frequency. The disclosed system is configured to record non-deterministic user inputs to the game software during execution. Also in this piece of prior art the system is configured to simulate a first game software execution by inputting said recorded non-deterministic inputs to said game software during a second execution. The purpose is to be enable replay of a game for freeze frame and slow motion presentation.

OBJECT OF THE INVENTION

It is an object of the present invention to provide a system for managing interruption and reconnection of game sessions in a computer based gaming system with a computerized gaming machine that is connected to remote data storage.

SUMMARY OF THE INVENTION

The object is achieved by providing a mechanism that enables reconstruction of a game session up to the point of an interruption. Each game session is assigned an identity code for reconnection, in short called reconnect identity code, for the case that an interruption occurs during execution of the game session. Each reconnect identity code identifies a specific game session and the reconnect identity code is stored in remote data storage that is communicatively connected to the gaming machine. Game session data is stored in a manner that is independent of the specific game as well as of the specific gaming machine. More specifically, critical game session data that is necessary for the reconstruction of a game session is stored associated with the reconnect identity code in the remote data storage. If a game session is interrupted, an indication of this fact is stored with the associated reconnect identity code. An interruption of a game session can in this context occur in different ways. The interruption may be intentional or unintentional as a result of a player action, may be due to a system operation action in response to monitored parameters or due to gaming machine failure, data communications failure or other system failure.

In order to reconnect and resume the game session, the reconnect identity code is identified in a suitable manner dependent on the implementation and configuration of the gaming system and the associated game session data is retrieved from the remote data storage. The thus retrieved game session data is used for reconstruction of the game session up to the point of interruption and from there the game is continued in a normal manner operated by a player on a gaming machine.

The reconnect identity code that is associated with a specific game session is, as mentioned above, identified in a manner that depends on the implementation and configuration of the gaming system. This identification is based on the right of a specific player to a specific interrupted game session, and therefore the identification should preferably be possible to couple to or to communicate to a specific player. In many gaming systems the coupling to the person who is the player must be indirect, since the player may be anonymous or player is identified via an identified physical device or an identified user account. Different aspects of this problem are addressed by different embodiments of the invention.

In accordance with one aspect, an embodiment of the invention is devised such that the reconnect identity code is coupled to an identity of the specific gaming machine upon which the gaming activity takes place. In this instance the gaming machine identity is stored associated with the reconnect identity code. This embodiment is useful in gaining systems in which the player can reasonably prove that he or she played on a specific gaming machine at the time when an interruption occurred. In a further developed variety of this embodiment, the invention is devised such that the reconnect identity code is stored in local data storage on the gaming machine in addition to being stored in the remote data storage. When a game session is interrupted, indicia that represents the reconnect identity code is output from the gaming machine via a suitable medium. In an advantageous embodiment, the gaining machine prints the indicia that represent the reconnect identity code on a voucher in the shape of for example a piece of paper and outputs it to the player. This voucher is a token of value and represents the right to an interrupted game session and is used to reconnect the game session. Such a reconnect voucher would preferably be printed with said indicia that represents the reconnect identity code in a machine readable form, e.g. a bar code, as well as with human readable information, e.g. a text or an image. A player in possession of a reconnect voucher would use this by inputting the reconnect identity code carried on the reconnect voucher to the gaming system typically via a gaming machine that is connected to the remote data storage, possibly but not necessarily the same gaming machine that was interrupted and produced the reconnect voucher. The information on the reconnect voucher thus including the reconnect identity code is read by the gaming machine, the game session data is retrieved from the remote data storage dependent on the reconnect identity code and the game is reconstructed up to the point where it was interrupted as described above. From thereon the player continues his play as before the interruption.

In an embodiment applied in a gaming system that operates with player cards provided with portable storage means that is accessible from the gaming machine, the indicia that represents the reconnect identity code is stored on the portable storage means of the player card and is otherwise used in a manner similar to the reconnect voucher described above. In another embodiment applied in a gaming system that operates with player accounts, the reconnect identity code is stored associated with the player account. A player then has his balance of reconnect rights on his player account records, and inputs the reconnect identity code to the gaming system and activates a reconnect procedure from the account.

In other varieties the reconnect identity code is communicated between the player and the gaming system by means of short range radio frequency communications such as via a Bluetooth device or an RFID (radio frequency identification) device. There are also combinations wherein the reconnect identity code is output by a first type of communication means, such as via a reconnect voucher, and input via a second type of communication means, for example via a keyboard interface that e.g. may be realised on a touch screen.

An advantageous embodiment of the invention is realised in. a gaming system concept based in client-server architecture. A game application program comprises a game specific client module executed in a client gaming machine provided with a game application program interface and a game specific server module executed in a gaming server also provided with a game application program interface. The gaming machine as well as the gaming server comprises general gaming functions that are available as services for different games executed by the respective gaming specific client and server modules. In the client gaming machine there are general client gaining functions such as a graphical user interface, a cashbox, sound presentation means, buttons and data communications means typically devised for providing an interface between the player and the specific game as well an interface between the specific game and the server. In the gaming server there are general server gaming functions in particular a random number generator, a database and a gaming application program interface via which the gaming specific server module calls the general gaming functions upon a request from the client module. The database in the server is thus the remote database from the point of view of the client gaming machine.

The invention is based on the fact that, given the same initial state, a certain sequence of input will always produce the same sequence of output and the same resulting game state. In accordance with the invention, the system is configured to record, in the server database, non-deterministic inputs to the game software during execution. More specifically, user inputs and all random numbers that occur during the execution of a game are stored in the server database with an associated game session identity code and an associated reconnect identity code. In this context, the stored user input should be understood to mean a selection of the actual user input, the received user input signal, a representation of the user input or the response by the game application program on a user input.

After a game session has been interrupted, the game session is reconnected and resumed by retrieving the game session information from the server database in response to inputting the reconnect identity code, e.g. by inserting a reconnect voucher into the same or a different client gaming machine. The game session is reconstructed, in one variety of the invention by initiating a new execution of the game and executing the game with the stored series of user inputs and random numbers from the retrieved game session information. The game is thus re-played by means of a replay mechanism up to the state where it was interrupted and the player can continue from there with all stakes and game states preserved. The invention enables a game to be resumed from any client gaming machine in the gaming system.

In accordance with the inventive concept, the interruption, reconnection and reconstruction of a game session is handled by separate control units that are independent from the game application program. This entails that the interruption and reconnection management procedures are handled in a uniform manner and therefore higher robustness is achieved in the gaming system. This also has the effect that game development and system testing is faster and less costly, due to lower complexity in game development. Furthermore, games executed by the respective gaming specific client and server modules. In the client gaming machine there are general client gaming functions such as a graphical user interface, a cashbox, sound presentation means, buttons and data communications means typically devised for providing an interface between the player and the specific game as well an interface between the specific game and the server. In the gaming server there are general server gaming functions in particular a random number generator, a database and a gaming application program interface via which the gaming specific server module calls the general gaming functions upon a request from the client module. The database in the server is thus the remote database from the point of view of the client gaming machine.

The invention is based on the fact that, given the same initial state, a certain sequence of input will always produce the same sequence of output and the same resulting game state. In accordance with the invention, the system is configured to record, in the server database, non-deterministic inputs to the game software during execution. More specifically, user inputs and all random numbers that occur during the execution of a game are stored in the server database with an associated game session identity code and an associated reconnect identity code. In this context, the stored user input should be understood to mean a selection of the actual user input, the received user input signal, a representation of the user input or the response by the game application program on a user input.

After a game session has been interrupted, the game session is reconnected and resumed by retrieving the game session information from the server database in response to inputting the reconnect identity code, e.g. by inserting a reconnect voucher into the same or a different client gaming machine. The game session is reconstructed, in one variety of the invention by initiating a new execution of the game and executing the game with the stored series of user inputs and random numbers from the retrieved game session information. The game is thus re-played by means of a replay mechanism up to the state where it was interrupted and the player can continue from there with all stakes and game states preserved. The invention enables a game to be resumed from any client gaming machine in the gaming system.

In accordance with the inventive concept, the interruption, reconnection and reconstruction of a game session is handled by separate control units that are independent from the game application program. This entails that the interruption and reconnection management procedures are handled in a uniform manner and therefore higher robustness is achieved in the gaming system. This also has the effect that game development and system testing is faster and less costly, due to lower complexity in game development. Furthermore, the server 4 is provided with a game application program interface, in short called server game API 6, enabling communication between a server module of a specific game application program 8 and general server gaming functions 10,12,14,16 installed on the server. The general server gaming functions are provided to be available for any specific game application program independently of the specific game content. These general server gaming functions are typically critical functions such as a database 10, a random number generator 12, an account service function 14, a log service function 16, or other functions that beneficially are shared and used by different specific game application programs.

The client gaming machine 2 is also provided with a game application program interface, in short called client game API 20, enabling communication between a client game module 18 of the specific game application program and general client gaming functions 22,24,26,28 installed on the client gaming machine 2 and used by different client game modules. The general client gaming functions are designed for assisting in implementing and executing a specific game on the client gaming machine 2 and are available for the client game module 18. These general client gaming functions are in different embodiments a selection of a graphical user interface GUI 22, a cashbox function 24, a sound function 26, user input interface function, for example buttons, 28, data storage 29, a printer 3, a bar code reader 33 and other functions that are related to the performance of a game. The client game module 18 is communicatively coupled to the corresponding server game module 8 for communicating requests 9 and responses 11 in order to utilize the general gaming functions provided in the server. For each game a message protocol for communication between the client module and the server module is generated, the protocol is for example based on XML and is shared by the client and the server.

A specific game application program in accordance with the invention thus comprises a server game module 8 and a client game module 18 that communicate either directly or via an application program interface on the client side and the server side respectively as shown in FIG. 1 and FIG. 3. The client game module 18 uses a selection of general client gaming functions that are available in the client gaming machine, whereas the server module 8 uses a selection of general server gaming functions 10,12,14,16 that are commonly used by different game applications and that are provided and available centrally in the server 4.

FIG. 3 shows a more detailed view of the configuration of a client and a server in a gaming system in accordance with an embodiment of the invention and similar to that of FIG. 1. In the gaming server 4 the server game module 8 is embedded behind an application program interface called server game API 6 through which all communication of the server game module 8 takes place. The gaming server 4 further comprises a server application program interface in short called server API 40 through which all communication with the general server gaming functions 10,12,14,16 from the part of the server game API 6 as well as from the part of other server functions and external communication takes place. The server 4 is further provided with a server reconnect handler 32 that in a preferred embodiment is integrated with the server game API 6. The server reconnect handler 32 comprises functional means devised to manage game session information relating to a reconnect identity code and devised to communicate inputs to and outputs from the server game module 8 for the purpose of re-executing the game session up to the point of interruption. This functionality realises a replay function and substitutes the client functionality during reconstruction of a game session.

The gaming server 4 is also provided with further server function modules, in the exemplifying embodiment more specifically comprising a client handler 36 that is communicatively coupled to the server API 40. The client handler 36 manages, inter alia handles and serves, communications and functions of the client 2 other than the specific game applications. As illustrated in the drawing with a double arrow, communications with the client gaming machine 2 takes place via the server API 40 and a similar client API 38 provided in the client gaming machine 2.

In a manner similar to that described above, the communication with the general client gaming functions is carried out via the client API 38. The client gaming machine 2 comprises a client control module 34 that controls communications and general functions of the client gaming machine other than the specific game applications and communicates via the client API 38. In the gaming client 2 the client game module 18 is, similar to the configuration of the server, embedded behind an application program interface called client game API 20 through which all communication of the client game module 18 takes place. The client 2 is further provided with a client reconnect handler 30 that in a preferred embodiment is integrated with the client game API 6. The client reconnect handler 30 comprises functional means devised to manage game session information relating to a reconnect identity code and devised to communicate inputs to and outputs from the client game module 8 for the purpose of re-executing the game session up to the point of interruption. This functionality realises a replay function and substitutes the client functionality during reconstruction of a game session. In one embodiment, the replay is executed in the server after having retrieved stored game session information from the database to the server reconnect handler. In another embodiment, the replay is executed in the client after having retrieved the stored game session information from the database and communicated said information to the client reconnect handler. In yet another embodiment, a part of the replay is executed in the server and a part is executed in the client. The latter variety allows for replaying overlapping or entire parts of the replay in the server and in the client, and to verify that the respective replay execution is correct.

FIG. 2 shows schematically a simple example of a portion of a gaming application in accordance with the invention, more particularly a flip coin game of chance. The game is run by executing the client game module 18 and the general client gaming functions of the flip coin gaming application in a client gaming machine in step 202. In step 204 the player is presented a message asking the player to bet on heads or tails. The player places a bet 206 and a result is calculated in 208. Step 208 involves the client game module 18 sending a request to the server game module 8 to generate an outcome of the game. The server game module in its turn calls the random number generator 12 and receives a random number in return. The server game module calculates an outcome according to predetermined rules for the game and dependent on the returned random number. Thereafter, a response with the outcome Win or Lose is communicated back to the client game module. If the outcome is Lose 210 the player is presented a message showing that player lost 212, and the game is ended in 214. If, on the other hand the outcome is Win 216 the player is presented a message asking player to collect the prize or double a bet again 218. If the player inputs a request to Double 224, a new result is calculated in 208 in the above manner. If on the other hand the player inputs a request to Collect 219, the prize, usually in the form of cash or credit money, is paid to the player and the game ends in 222. The payout of a prize again preferably involves requesting services from the server game module and for example utilizing the general server gaming functions account function 16 and database function 10.

Preferred Embodiment of Interruption and Reconnect Management

In accordance with the inventive concept, interruption or abnormal termination of a player session during playing a game is handled by means of a reconnect function. The reconnect function is managed by storing the previous game configuration in the server database at the beginning of each game round. All user interactions and inputs that occur during the game round as well as the random numbers that were generated are stored in the server database. When a player session is terminated due to an interruption a reconnect voucher is created by the client gaming machine and output to the user. The voucher comprises a reconnect identity code used to identify the interrupted game and preferably also account balance information. The player can thereafter request a reconnect by inputting the voucher to the same or to another gaming machine. The game is initialised with the game session properties that were stored at the beginning of the round and retrieved from the database by means of the voucher identity code, and is brought up to and presented to the player at the point of interruption. Thus the reconnect function enables the player to continue the game at the same stage as when interrupted.

FIG. 4 illustrates schematically the lifecycle of a game in accordance with an embodiment of the invention drawn in relation to a timeline 424. A player session 401 is initiated by a player by inputting start commands via a user interface of the gaming machine. The player initiates a game and inputs a bet in terms of a monetary value by means of some kind of payment method such as coins or an account transaction and thereby starts a first game session 402. The game session progresses in discrete steps herein called game rounds and exemplified with a first round 404 and a second round 410. Each round in turn progresses in discrete steps called game phases. So for example, round 404 comprises three game phases 406,407 and 408. The transition between game phases is driven by game round events which in different embodiments may have different content and different triggering mechanisms.

A game round event is triggered by an input that starts the generation of a set of associated elements of critical game session data that defines a game result preferably comprising the current bet value, a current generated random number and a current win value. The game round event would usually be triggered by a player making an input through an I/O interface such as a push button that conveys game commands like “Deal cards!” in. a poker game.

In a simple embodiment of the invention the game session data that defines a game result is generated in a gaming machine and this game session data is stored in remote data storage. The game round event is triggered whereupon the generation of this set of game session data is executed and the data set is completed and stored in the remote data storage. A confirmation of successful storage is generated, a presentation of the game result is output to the player and the game phase is ended. In another embodiment based on the client-server architecture described above, the client game module contacts the server game module with a request in response to the triggering of a game round event. The server game module executes the request and creates game result defining game session data for the current game phase. This data is stored in the server database and a response comprising the game result defining data is transmitted to the client whereupon a presentation of the game result is output to the player and the game phase is ended. The presentation of the game result to the player typically comprises updating a screen display of the gaming machine.

At the beginning of each game phase, in FIG. 4 illustrated with time indicators A, B, C, D, the gaming machine, e.g. the client game module, is set in a waiting mode waiting for input from the player. When a game round event is triggered by the player, the gaming machine, e.g. the client game module and the server game module executes the game rules, moves the game process to the beginning of the next phase, stops and again goes into the waiting mode to wait for player input. From a gaming system macro perspective the execution of a game progresses in discrete steps where the game phases are the smallest units of execution.

An interruption of a game session can, as mentioned above, occur or is triggered in different ways and in different situations. The interruption can occur or be triggered at any point in time and may be intentional or unintentional as a result of a player action, may be due to a system operation action in response to monitored parameters or due to gaming machine failure, data communications failure or other system failure. An interruption can be defined as the event that the gaming machine looses contact with the remote data storage, or as the case may be in a client-server gaming system with the server, for a predetermined amount of time during a game session. The predetermined amount of time may depend on a configuration parameter that is selected for example based on a time delay in game response that is assumed to be acceptable or convenient for the player. Other monitored parameters used to trigger an interruption can be selected based for example on total player session time, total value of bets or total value of prize or other statistics parameter. Monitored parameters can also relate to hardware or software properties such as temperature or execution delay time.

FIG. 5 shows a schematic sequence diagram that illustrates communications between a client game module 502 of a gaming machine and a remote data storage and server game module 504, as well as executed steps occurring during a game phase depicted in relation to time lines 520. The current game phase starts at 506 Time A and a waiting mode is entered and lasts until there is a game round event 512 comprising transmitting a request 512 from the gaming machine/client game module 502. The request is received at the remote data storage/server game module 504 whereupon in step 514 the request is executed and resulting game session data is stored in a database residing in the data storage. In the simpler embodiment not involving a client-server configuration, a procedure call to generate the game result defining data would correspond to the request. The execute and storage step 514 is completed at 508 Time Al and thereafter in step 516 a response comprising resulting game session data is transmitted from the remote data storage/server game module 504 to the gaming machine/client game module 502. After receipt of the response the gaming machine/client game module 502 presents an output, e.g. an animation of a game outcome via the display screen dependent on the result of the execution in the game round event, which is terminated at 510 Time B with a transition into the next game phase. The execution and storage step 514 is treated to be atomic in the sense that either it is completed or it is entirely failed. A game phase is considered to be complete when the execution and storage step 514 has been completed, i.e. at 508 Time Al, whether or not the following steps 516,518 up to 510 Time B have been completed when an interruption occurs.

The problem of proving the right of a player to a certain interrupted game session is in one embodiment of the invention handled by issuing a reconnect voucher when a game session is interrupted. Each new player session, i.e. each execution instance of a game, is given a reserved reconnect identity code when it is initiated and, as previously mentioned, the stored non-deterministic inputs and execution results and outcomes make up game session data that are associated with the reconnect identity code. The reconnect identity code is preferably stored in a local data storage comprised in the client gaming machine as well as in a remote data storage comprised in the server or provided at the server side. When a game session is interrupted the client gaming machine retrieves the reserved and stored the reconnect identity code preferably from the local data storage but possibly from the remote data storage, and then prints out a reconnect voucher with machine readable and/or human readable indicia that represent the reconnect identification code that identifies this specific interrupted game session. This reconnect voucher is a value token representing the right of a player to the interrupted game session and is also the key for identifying and retrieving the stored game session data. A game session is reconnected and resumed by inputting the indicia via a reconnect voucher interface provided on the client gaming machine. For the case that the client gaming machine is incapable of printing out a reconnect voucher, for example due to a hardware or software breakdown, the invention provides for the possibility to print out a reconnect voucher on a separate gaming administration machine connected to the gaining system. In this case the proper reconnect identity code is found in the server database by means of the client identification and point in time for the interruption. The indicia are in one embodiment printed and read in a bar code format, but other indicia formats are of course conceivable. The printed reconnect voucher is useful when the players are anonymous. In other embodiments where the identity of the player is known, for example using player card or player accounts it is convenient to store the reconnect identity code associated to the player together with account information in a database or on a writable data storage means on a player card.

An interruption can occur in different stages or states of a player session and a game. Therefore, the voucher or the corresponding carrier of information is preferably, in addition to the reconnect identity code provided with a machine readable status indicator. The client control module 34 monitors the client gaming machine and handles this kind of information. The status indicator indicates the following states:

1. Monetary credit only. This indicates the state that the player has an outstanding credit but there is no game result that belongs to the player. In this case there is no un-responded request registered by the client control module.
2. There is an unsynchronized monetary credit. This indicates that the player has entered money to the gaming machine or the game but they have not been registered with the server database in a request and response cycle.
3. There may be an interrupted game. In this case there is an un-responded request registered by the client control module. However, on the server side the execution and storage step may have been completed, and may have resulted in two different cases. 2A. There is an outcome that means that there a monetary credit only, or 2B. There is an outcome that is intermediate and entails the right to continue the game with some monetary credit.

The communication between the gaming machine and the remote data storage as well as other steps that are performed for realising the invention are described in the following exemplifying embodiment based on the client-server configuration. Reference is made to FIG. 1-4. The numbered list below is merely for reference purpose and does not necessarily mean that the steps are performed in a sequence corresponding to the indicated numerical order.

1. A player initiates a player session 401 on the client gaming machine 2 by inputting a start command to the client game module 18 via an 110-interface (22,24,28) which may be a traditional button or a button field on a touch screen. The initiation of a player session would preferably also comprise a monetary transaction for bets in the game, for example by the player adding a coin to a cash box 24 or by means of an account transaction.

2. The client reconnect handler 30 comprised in the client gaming machine 2 transmits a request for the reservation of a reconnect identity code together with a client identification code for identification of the specific gaming machine to the server. This request is received by the server reconnect handler 32 similarly comprised in the gaming server 4.

3. The request is executed by the server reconnect handler 32 whereby a reconnect identity code is generated and stored associated with the client identification code in a database 10.

4. A player session identity code is generated and associated with the reconnect identity code in the database 10, and a player session 402 is established.

5. The reconnect identity code is transmitted to the client reconnect handler 30 and is stored in local data storage 29 in the client gaming machine 2 for the purpose of enabling communication of the reconnect identity code to the player.

6. A selected game is started by the player inputting a game start command to the game client module 18 via the game application program interface 20 of the client gaming machine 2, and a request to start a game session is transmitted to the gaming server 4.

7. A game session identity code is generated and stored associated with the player session identity code, a game session 402 is established and a game phase 406 of a game round 404 is entered.

8. The player triggers a game round event by giving a game related input to the client game module 18 whereupon a request for a service is transmitted to the server game module 8.

9. The request is executed by the server game module 8 with the aid of the service functions of the server. The execution of this request would typically comprise the generation of a random number RNG and the determination of an outcome dependent on the RNG.

10. Execution steps that are performed by the server game module 8 for each request as well as results and outcomes of the execution make up game session data, i.e. information that applies to the currently ongoing game session. A subset of the game session data is the result of a game round event and applies to the current game phase. A selection of these game session data are compiled and cashed, i.e. temporarily stored in data storage of the server 8. The selection may vary in different execution cases and embodiments, and would preferably comprise: the bet value, the random number and the win value that are valid for the current game phase. The selection of game session data may also comprise optional pieces of information regarding the sequence of events called event history, each request and response, a pot at stake, the request, the response to the client gaming machine, game configuration information and a status indicator devised to indicate whether the game session has been completed or interrupted e.g. indicating last event=true/false.

11. The selection of game session data is stored in the database 10 and is transmitted with a response to the client gaming machine 2. The received selection of game session data is cashed, i.e. temporarily stored in data storage of the client gaming machine 2.

12. The outcome of the game round event is presented to the player for example via image output on a presentation screen of the client gaming machine 2.

13. The steps 8-12 are normally repeated until a game round is ended for example by the fact that a bet monetary balance has been consumed, or the player selects a new game to play.

14. If an interruption occurs, for example triggered when the client looses contact with the server, then the reconnect identity code for the current game execution instance is in the server database associated with a status indicator indicating that the game execution has been interrupted. The reserved reconnect identity code that is temporarily stored in the storage 29 of the client gaming machine 2 is printed out on a piece of paper or other suitable carrier to make up a reconnect voucher output to the player. The reconnect voucher is in a currently preferred embodiment printed with a bar code comprising the reconnect identity code and a status indicator for the interrupted game, and some text information for example about the gaming venue.

For the purpose of reconnecting the game and resume the game session the interrupted game is found by means of the reconnect identity code as a key input to the gaming system. The reconnect procedure is here explained by way of example with the reconnect voucher embodiment in which the player enters a reconnect voucher in a bar code reader of a client gaming machine of the gaming system. It should be understood that also other means of conveying the reconnect identity code to the gaming system are within the inventive concept. The reconnect voucher can for example be inserted in the same gaming machine in which the game was interrupted, a different gaming machine or in an administrative client terminal. The administrative client terminal is preferably devised only to be able to refund money or issue a monetary credit.

The procedure for reconnection comprises in one embodiment a selection of the following steps.

1. If the client gaming machine in which the game was interrupted logins with the gaming server and a new player session is initiated, the client handler 36 of the gaming server detects in a check procedure that this particular client gaming machine has had an interrupted game. The client identification code is associated with the previous reconnect voucher for that specific client and the stored game session data, and a new reconnect identification code is reserved and transmitted to the client gaming machine to replace the previous and actived reconnect identity code.

2. If a player starts a player session in a different client gaming machine, a new reconnect identification code is reserved in the normal manner.

3. The player inputs a reconnect voucher into the bar code reader of the client gaming machine, and the information on the reconnect voucher is read and treated under the control of the client control module 34 and the client reconnect handler 30. The information on the reconnect voucher is transmitted with a request to the gaming server.

4. The gaming server checks the status of the reconnect voucher and determines by means of the status indicator and information stored in the server database whether there is an interrupted game session.

5. If there is a monetary credit only, the money is credited to the player for a new game or as a refund.

6. If there is un-synchronized money, a synchronization procedure is executed.

7. If there is an interrupted game, the game is reconstructed and presented to the player in the state in which it was interrupted.

The reconstruction of an interrupted game can be implemented in various manners. One embodiment comprises of the following steps, as shown in FIG. 6.

1. As shown in step 602 of FIG. 6, with the reconnect identity code as a key, the associated game session data is retrieved from the server database under the control of the server reconnect handler 30.

2. As shown in step 604 of FIG. 6, the server reconnect handler 30 uses the retrieved game session data as input to the server game module 8 and generates the last response from the server game module that should have been transmitted to the client gaining machine unless the interruption had occurred. In different embodiments 3. As shown in step 606 of FIG. 6, reconnect information comprising game session data is compiled and transmitted to the client reconnect handler 30 of the client gaming machine. In one embodiment this reconnect information comprises the game identifications for the server game module and the client game module, game session data including an initial monetary balance, all requests and all responses of the event history.

4. As shown in step 608 of FIG. 6, in the client gaining machine, the client game module is initiated and the game is executed by the client reconnect handler 30 using the game session data as input up to the last completed game phase before the point of interruption, called the reconnect target point. In contrast with the normal execution of a game, the requests that are generated in the reconnect execution are discarded and after each request the game is presented with the corresponding response from the game session data. Since the client reconnect handler 30 has access to all the requests as well as the responses to the requests it is enabled that a check of a proper reconstruction of the game session can be performed. Preferably, the game is executed up to the reconnect target point without presenting the intermediate results to the player in order to speed up the execution and avoid confusing the player.

5. As shown in step 610 of FIG. 6, after the last event and thereby the last completed game phase has been executed, the corresponding result and state of the game is presented to the player via the graphical user interface and the game enters a waiting mode waiting for the next input from the player.

6. As shown in step 612 of FIG. 6, the game continues in a normal manner.

Figure 1:
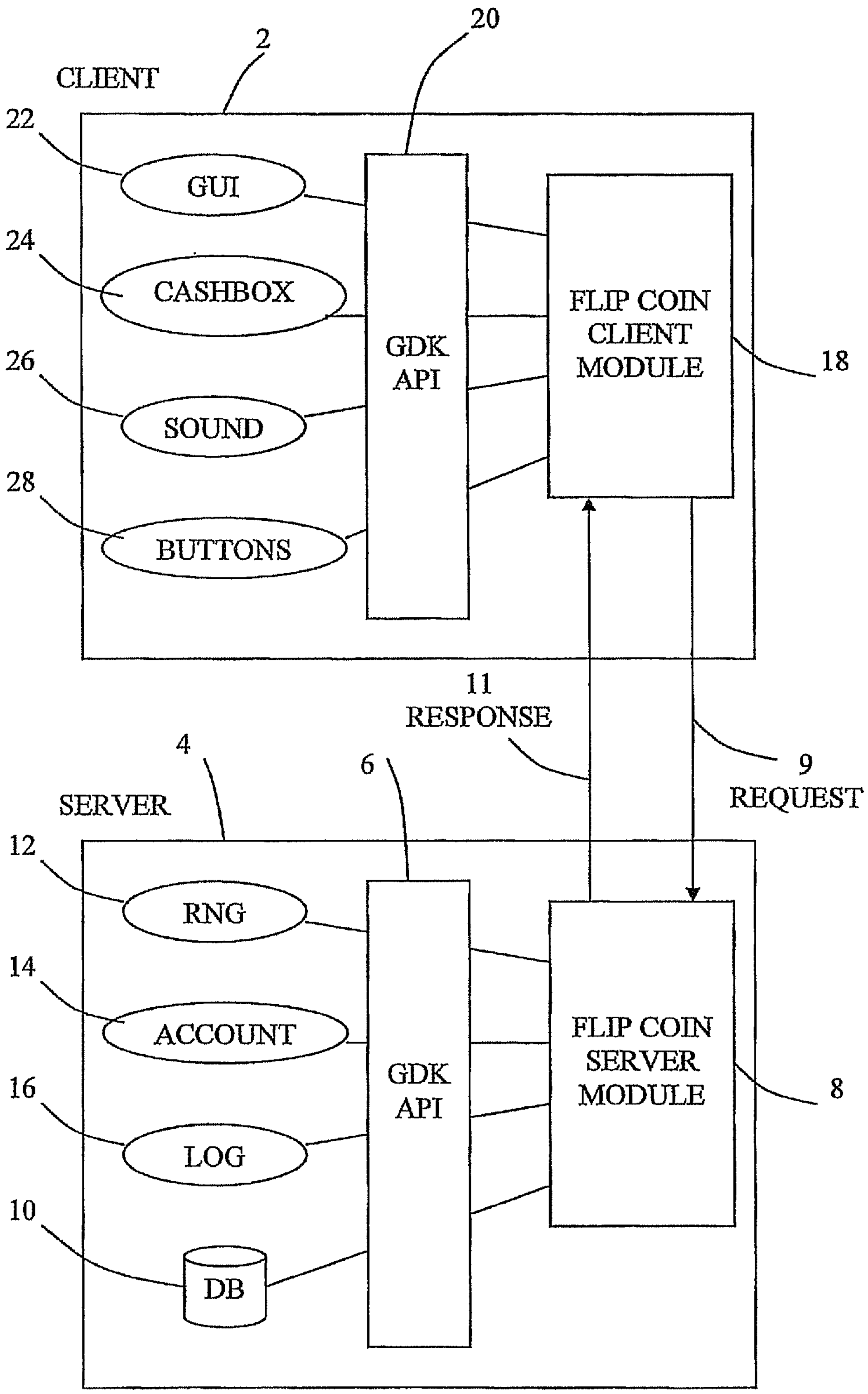
FIG. 1 shows a client and a server in a gaming system.
Figure 2:
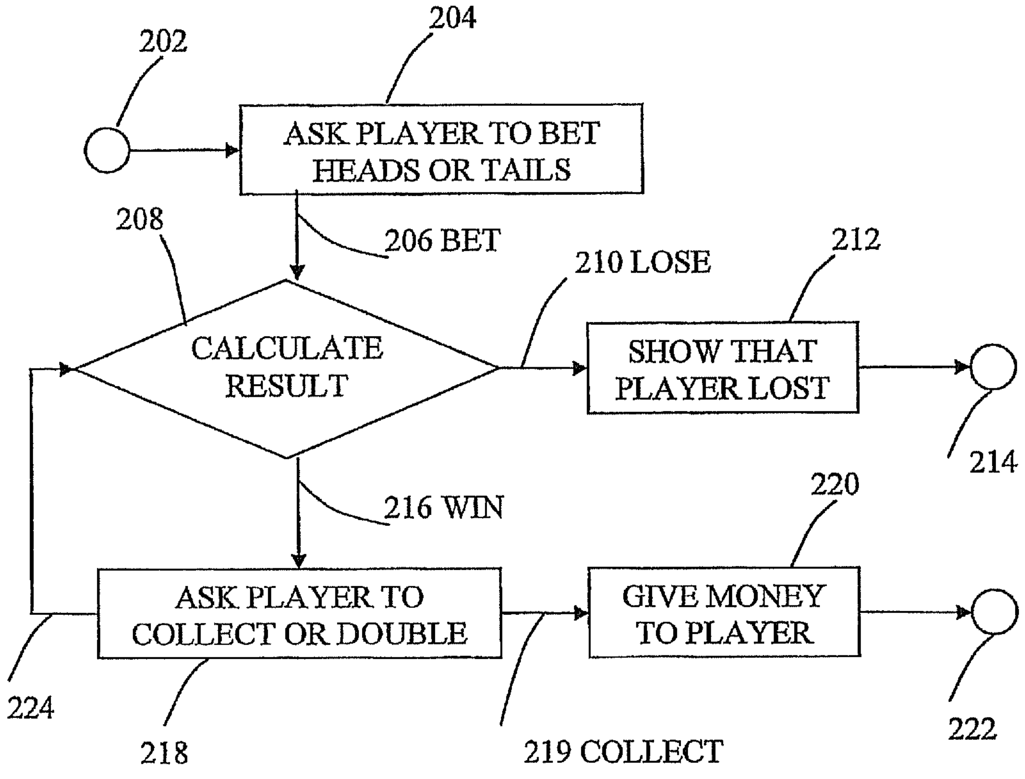
FIG. 2 shows an example of a portion of a gaming application.
Figure 3:
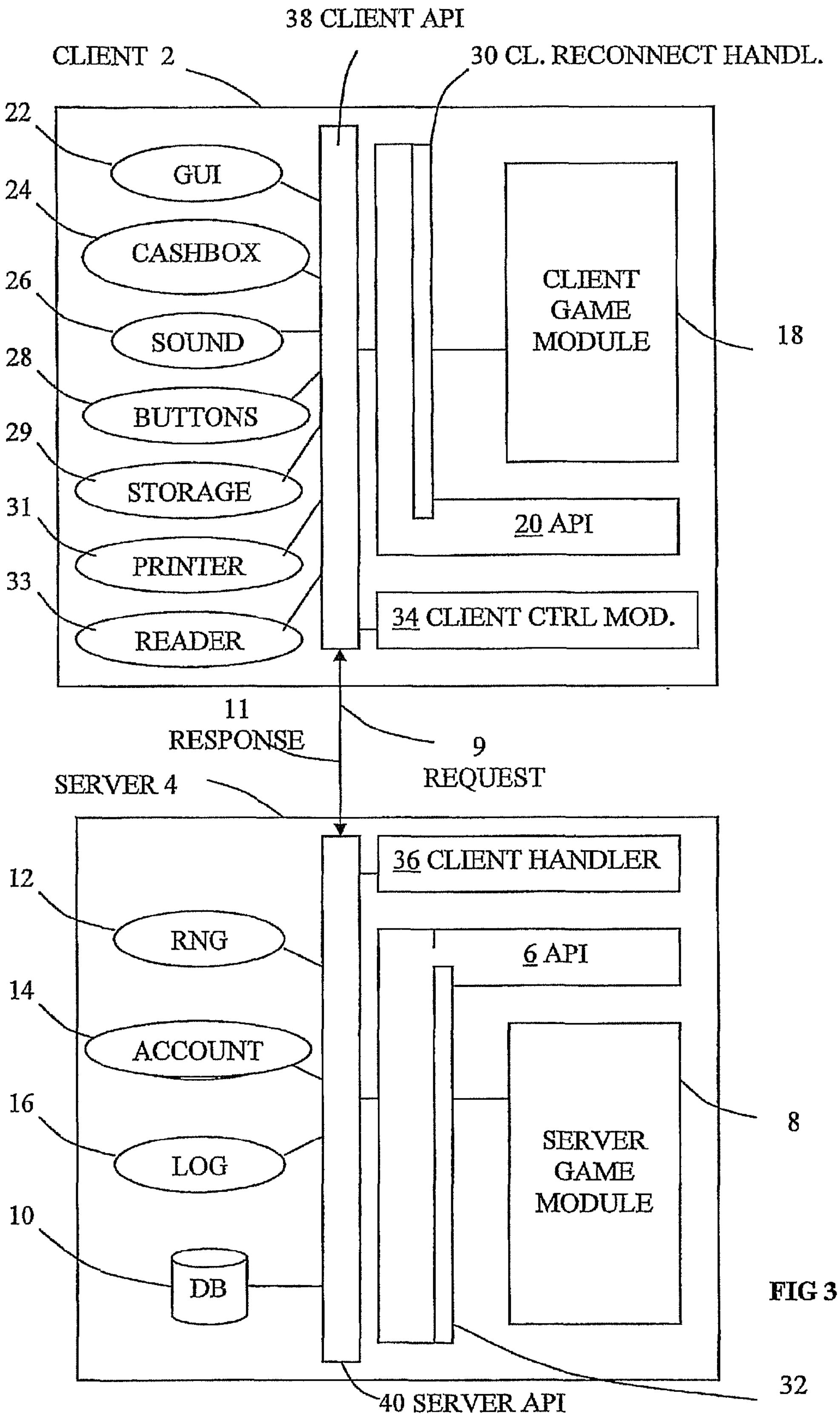
FIG. 3 shows a client and a server in a gaming system.
Figure 4:
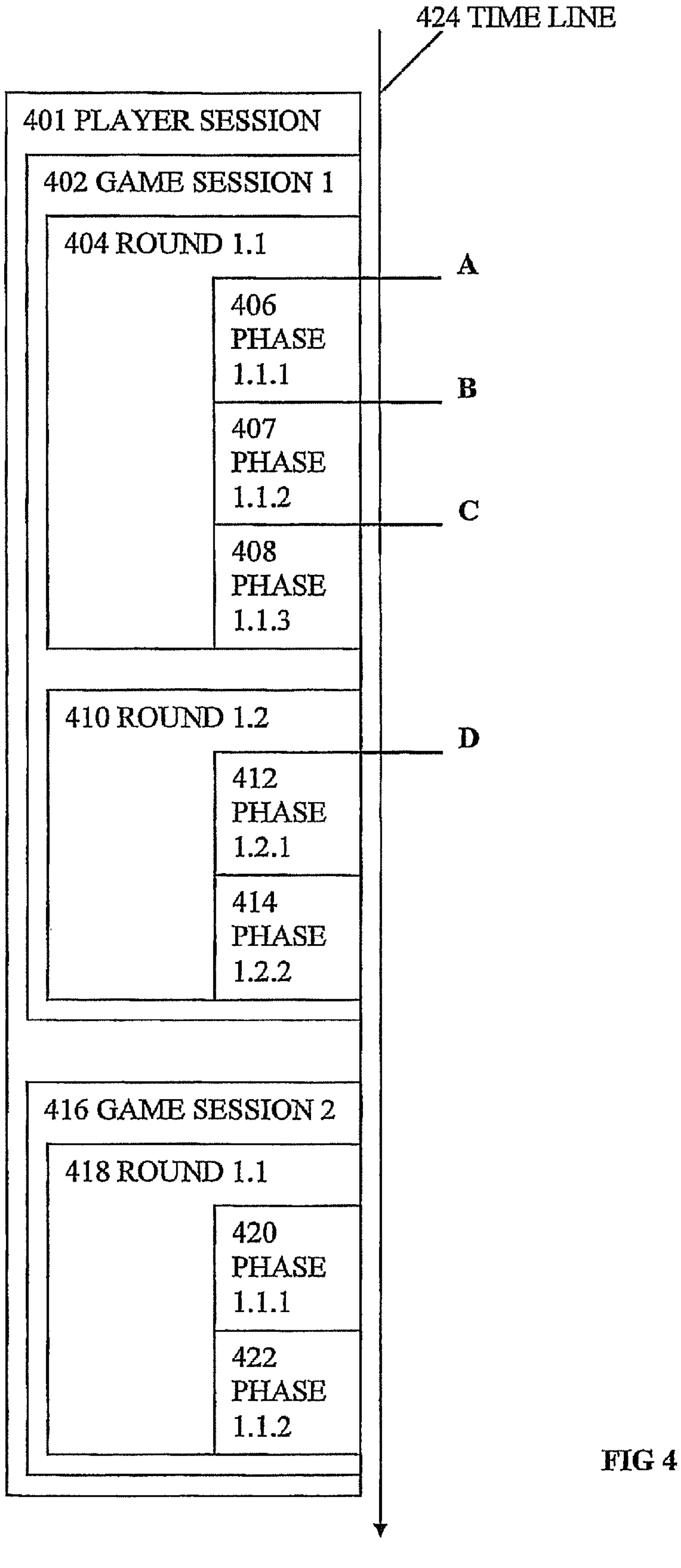
FIG. 4 shows the life cycle of a game.
Figure 5:
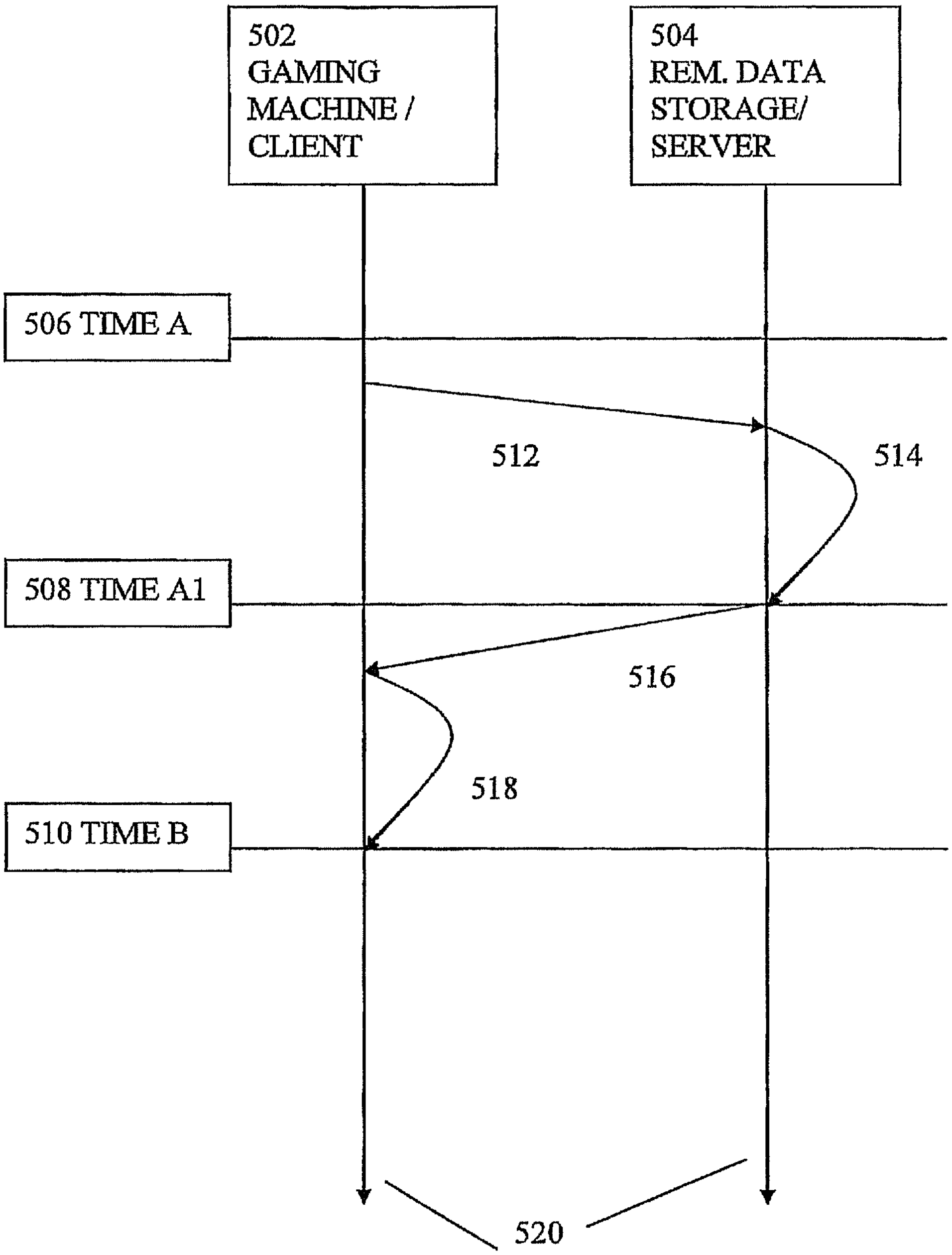
FIG. 5 shows a schematic sequence diagram.
Figure 6:
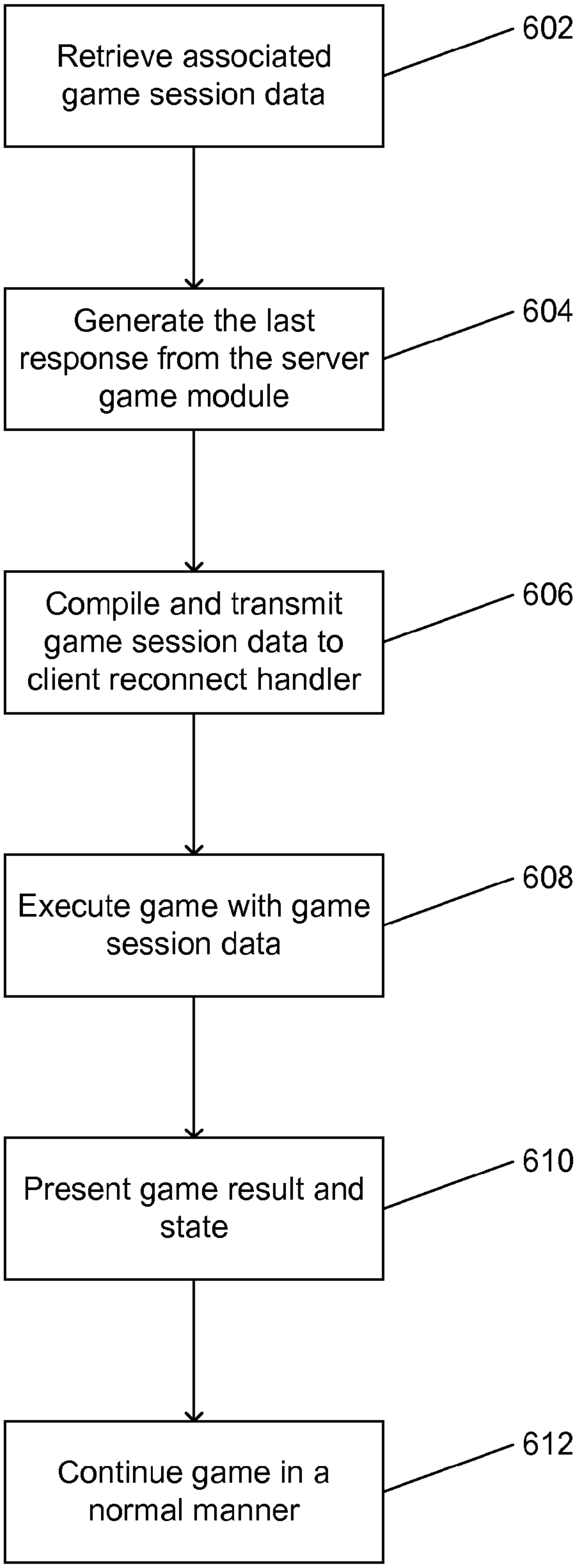
FIG. 6 shows a flow diagram of the implementation of a reconstruction of an interrupted game session.

The invention claimed is:

1. A method for managing interruption and reconnection of a game session in a computer based gaming system having a client gaming machine configured to execute a game and being communicatively connected to a gaming server including a remote data storage, the client gaming machine comprising a credit device that includes at least one of a coin/bill acceptor, a card reader, a ticket reader, a cashbox, and a ticket printer, the method comprising:

receiving, by the credit device of the client gaming machine, credit input by a player to establish a credit balance;

receiving, by a client game module of the client gaming machine, player input signals input by the player to make a wager having a wager value from the credit balance to initiate a gaming session;

reserving, by a client reconnect handler of the client gaming machine, an identity code in the remote data storage of the gaming server for identification of the gaming session and the client gaming machine;

transmitting, by the client game module, a request for a game outcome to a server module of the gaming server for at least one game phase of the gaming session, the server module communicatively coupled to the client game module, the request including game rules and the wager value associated with the gaming session;

determining, by the server module, outcome information for the at least one game phase, the outcome information based on the game parameters and a random number generated by a random number generator associated with the gaming server;

associating, by the server module, game session data for the at least one game phase with the identity code and storing the associated game session data and identity code in the remote data storage, the game session data including at least one of the wager value, the random number, and the outcome information;

associating, by a server reconnect handler of the gaming server, a status indicator with the identity code in the remote storage indicating an interruption of the game execution when an interruption occurs before completion of the at least one game phase;

providing, by the client reconnect handler, the identity code and the status indicator to the player via the user interface function;

receiving, by the client game module, the identity code from the player via the user interface to initiate a second gaming session;

retrieving, by the client game module, the stored game session data associated with the identity code from the remote data storage;

reconstructing, by the client game module, the interrupted gaming session using the at least one of the wager value, the random number, and the outcome information to determine second outcome information, wherein the second outcome information is based on the same game parameters and random number as in the interrupted gaming session before the interruption occurred;

displaying, by the client game module, the second outcome information via the user interface function; and crediting, by the client game module, the credit balance with a payout when the second outcome information indicates a win.

2. The method of claim 1, wherein indicia representing the identity code for an interrupted game execution instance is communicated via voucher in response to a game execution interruption.

3. The method of claim 1, wherein determining outcome information for the at least one game phase comprises determining the wager value, generating the random number, determining an outcome dependent on said random number, and determining a win value dependent on the outcome and the wager value.

4. The method of claim 3, wherein:

the status of a game execution instance associated with an identity code is determined in response to said identity code being input to the gaming system;

if the status indicates an interrupted game execution instance, then game session data associated to said identity code is retrieved from the remote data storage and the interrupted game execution is reconstructed up to the point of interruption dependent on said retrieved game session data in response to the input of said identity code.

5. The method of claim 1, wherein said identity code is stored to enable the reconnect identity code to be communicated to a player.

6. The method of claim 5, wherein: said reconnect identity code is stored in a local data storage of the client gaming machine; and, if the game session is interrupted, then indicia representing said identity code is output via an output medium.

7. The method of claim 6, wherein the indicia representing said identity code is output by being printed in a machine readable form on a printable medium and is output as a token of value in the shape of a voucher.

8. The method of claim 6, wherein the indicia representing said identity code is output by being stored on a portable storage medium.

9. The method of claim 8, wherein the indicia representing said identity code is input to the gaming machine via an input interface devised to read information on said portable storage medium.

10. The method of claim 6, wherein the indicia representing said identity code is output to a portable storage medium by creating electrical information signals.

11. The method of the claim 10, wherein the indicia representing said identity code is input to a gaming machine from a portable storage medium by creating electrical information signals.

12. The method of claim 5, wherein the indicia representing said identity code is stored together with a player account information.

13. The method of claim 12, wherein a player account is activated, said player account being stored with an identity code, said identity code being associated with a status indicator;

if said status indicator indicates an interrupted game session, then game session data associated to said identity is communicated to the gaming system.

14. The method of claim 1, wherein the indicia representing said identity code is input to the gaming machine via an input interface.

15. The method of claim 11, wherein:

the indicia representing said identity code is output onto a voucher being in the form of a printable medium; and said identity code is input to the gaming machine by means of a reader.

16. The method of claim 1, wherein:

a game session comprises initiating a game and performing one or more game round events;

a game round event comprises determining the wager value, generating a random number, determining an outcome dependent on said random number and determining a win value dependent on said outcome and the wager value;

an initiated game session is assigned a reconnect identity code that is stored in said remote data storage;

for each game round event storing game session data comprising the wager value, the random number and the win value associated with the reconnect identity code in the remote data storage;

the reconnect identity code is associated with a status indicator devised to indicate whether the game session has been completed or interrupted.

17. The method of claim 1, wherein each said storing operation of associated game session data comprises a confirmative response communication from the remote data storage to the gaming machine.

18. The method of claim 1, wherein a game execution interruption is triggered if the communicative connection between the gaming machine and the remote data storage is interrupted.

19. The method claim 1, wherein a game execution interruption is triggered in response to an electrical signal.

20. The method of claim 1, wherein a game execution interruption is triggered in response to abnormal termination of a player session.

21. The method of claim 1, wherein a game execution interruption is triggered in response to a loss of contact between said gaming system and said remote data storage.

22. The method of claim 1, wherein the gaming system is configured with a client-server architecture with a client gaming machine being communicatively connected to a server comprising the remote data storage.

23. The method of claim 1, wherein a game execution interruption is triggered if the communicative connection between the client gaming machine and the server is interrupted.

24. A method of claim 1 and further including a computer program product comprising computer program code portions devised to control a data processing means.

25. A gaming system for operating a gaming application, said gaming system comprising:

a gaming server comprising a data storage, a server module, a server reconnect handler, and a random number generator; and a client gaming machine communicatively coupled to said gaming server, said client gaming machine comprising a user interface for interacting with a player, a credit device comprising at least one of a coin/bill acceptor, a card reader, a ticket reader, a cashbox, and a ticket printer, a client reconnect handler, and a client game controller module, said client gaming machine configured to:

receive, by said credit device, credit input by a player to establish a credit balance;

receive, by said client game controller module, player input signals input by the player to make a wager having a wager value from the credit balance to initiate a gaming session;

reserve, by said client reconnect handler, an identity code in said remote data storage of said gaming server for identification of the gaming session and the client gaming machine;

transmit, by said client game module, a request for a game outcome to said server module for at least one game phase of the gaming session, the request including game rules and the wager value associated with the gaming session;

determine, by said server module, outcome information for the at least one game phase, the outcome information based on the game parameters and a random number generated by said random number generator;

associate, by said server module, game session data for the at least one game phase with the identity code, and store the associated game session data and identity code in said remote data storage, the associated game data including the wager value, the random number, and the outcome information;

associate, by said server reconnect handler, a status indicator with the identity code in said remote storage indicating an interruption of the game execution when an interruption occurs before completion of the at least one game phase;

provide, by said client reconnect handler, the identity code and the status indicator to the player via said user interface;

receive, by said client game module, the identity code from the player via the user interface to initiate a second gaming session;

retrieve, by said client game module, the stored game session data associated with the identity code from said remote data storage;

reconstruct, by said client game module, the interrupted gaming session using the at least one of the wager value, the random number, and the outcome information to determine second outcome information, wherein the second outcome information is based on the same game parameters and random number as in the interrupted gaming session before the interruption occurred;

display, by said client game module, the second outcome information via said user interface function; and credit, by said client game module, the credit balance with a payout when the second outcome information indicates a win.

26. The gaming system of claim 25, further comprising a printer for communicating the identity code for an interrupted game execution instance via voucher in response to a game execution interruption.

27. The gaming system of claim 25, wherein determining outcome information for the at least one game phase comprises determining the wager value, generating the random number, determining the outcome dependent on said random number, and determining a win value dependent on said outcome and the wager value.

28. The gaming system of claim 26, wherein:

the status of a game execution instance associated with an identity code is determined in response to said identity code being input to the gaming system;

if the status indicates an interrupted game execution instance, then game session data associated to said identity code is retrieved from the remote data storage and the interrupted game execution is reconstructed up to the point of interruption dependent on said retrieved game session data in response to the input of said identity code.

29. The gaming system of claim 25, wherein said identity code is stored to enable the reconnect identity code to be communicated to a player.

30. The gaming system of claim 29, wherein: said reconnect identity code is stored in a local data storage provided in the gaming machine; and if the game session is interrupted, then indicia representing said identity code is output via an output medium.

31. The gaming system of claim 30, wherein the indicia representing said identity code is output by being printed in a machine readable form on a printable medium by means of a printer and is output as a token of value in the shape of a voucher.

32. The gaming system of claim 30, wherein the indicia representing said identity code is output by being stored on a portable storage medium.

33. The gaming system of claim 32, wherein the indicia representing said identity code is input to the gaming machine via an input interface devised to read information on said portable storage medium.

34. The method of claim 30, wherein the indicia representing said identity code is output to a portable storage medium, by creating electrical information signals.

35. The method of claim 34, wherein the indicia representing said identity code is input to a gaming machine from a portable storage medium by creating electrical information signals.

36. The gaming system of claim 29, wherein the indicia representing said identity code is stored together with player account information.

37. The gaming system of claim 36, wherein a player account is activated, said player account being stored with an identity code, said identity code being associated with a status indicator;

if said status indicator indicates an interrupted game session, then game session data associated to said identity is communicated to the gaming system.

38. The gaming system of claim 25, wherein said identity code is input to the gaming machine via an input interface.

39. The gaming system of claim 35, wherein:

the indicia representing said identity code is output onto a voucher, being in the form of a printable medium; and said identity code is input to the gaming machine by means of a reader.

40. The gaming system of claim 25, wherein:

a game session comprises initiating a game and performing one or more game round events;

a game round event comprises determining the wager value, generating a random number, determining an outcome dependent on said random number and determining a win value dependent on said outcome and the wager value;

an initiated game session is assigned a reconnect identity code that is stored in said remote data storage;

for each game round event storing game session data comprising the wager value, the random number and the win value associated with the reconnect identity code in the remote data storage;

the reconnect identity code is associated with a status indicator devised to indicate whether the game session has been completed or interrupted.

41. The gaming system of claim 25, wherein each said storing operation of associated game session data comprises a confirmative response communication from the remote data storage to the gaming machine.

42. The gaming system of claim 25, wherein a game execution interruption is triggered if the communicative connection between the gaming machine and the remote data storage is interrupted.

43. The gaming system of claim 25, wherein a game execution interruption is triggered in response to an electrical signal.

44. The gaming system of claim 25, wherein a game execution interruption is triggered in response to an abnormal termination of a player session.

45. The gaming system of claim 25, wherein a game execution interruption is triggered in response to loss of contact between said gaming system and said remote data storage.

46. The gaming system of claim 25, wherein the gaming system is configured with a client-server architecture with a client gaming machine being communicatively connected to a server comprising the remote data storage.

47. The gaming system of claim 25, wherein a game execution interruption is triggered if the communicative connection between the client gaming machine and the server is interrupted.

48. The gaming system of claim 25, said system configured to operate a gaming application, the system having at least one client gaming machine connected to a gaming server, comprising:

a server game module of a game application program provided in the server and devised to execute functions of a game;

general server functions providing a random number generator and a database in the server;

a server game application program interface provided in the server and enabling communication with the server module of said game application program;

a server reconnect handler devised to operate functions related to interruption and reconstruction of game execution;

a client handler devised to manage communications and functions of the client gaming machine;

a server application program interface provided in the server and enabling internal communication between functional units of the server and external communication with functional units of the client gaming machine;

a client game module of said game application program provided in the client gaming machine and devised to execute functions of said game;

general client functions providing input and output functions for communication between the user and functions of the gaming system;

a client game application program interface provided in the client gaming machine and enabling communication with the client game module of said specific game application program;

a client reconnect handler devised to operate functions related to interruption and reconstruction of game execution;

a client control module devised to control communications and functions of the client gaming machine.

49. The system of claim 25, comprising a mechanism for execution of said specific game application program with stored game session data as input data up to a resulting intermediate game state.

50. The system of claim 49, the system further being devised to execute said game application program from an intermediate game state to a resulting end state.

* * * * *